G. F. Taylor,
Carpet Sweeper.
No. 103,939. Patented June 7, 1870.

Witnesses
A. W. Macdonald
Thomas Driffell

Inventor.
Gilbert F. Taylor
per A. P. Haight
Attorney

United States Patent Office.

GILBERT F. TAYLOR, OF NEW YORK, N. Y.

Letters Patent No. 103,939, dated June 7, 1870.

IMPROVEMENT IN GEARING FOR CARPET-SWEEPING MACHINES.

The Schedule referred to in these Letters Patent and making part of the same.

*To all whom it may concern:*

Be it known that I, GILBERT F. TAYLOR, of the city, county, and State of New York, have invented a new and useful Improvement in Gearing for Carpet-sweeping Machines; and I do hereby declare that the following is a full, clear, and exact description of the same, reference being had to the accompanying drawing, making a part of this specification, in which—

Figure 1:
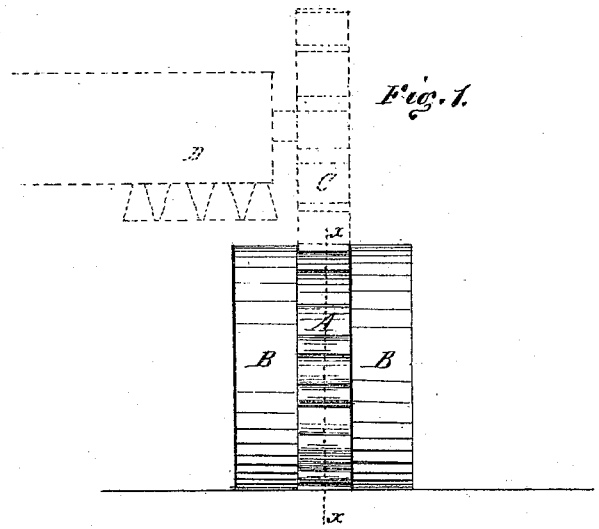

Figure 1 is an edge view of my invention.

Figure 2:
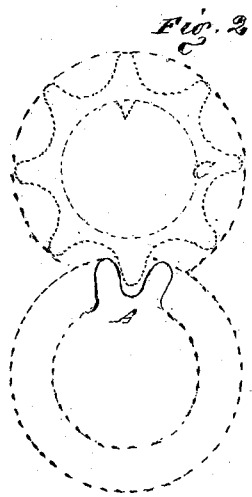

Figure 2, a side sectional view of the same, taken in the line $x\ x$, fig. 1.

Similar letters of reference indicate corresponding parts in the two figures.

This invention relates to a new and useful improvement in gearing for carpet-sweeping machines; and It consists in having the driving-gear and traction-roller all formed of India rubber and in one piece, as hereinafter fully shown and described, whereby two important results are obtained; first, a noiseless operation of the gear, and second, a requisite degree of traction to insure the rotation of the brush as the machine is shoved along over the carpet.

Hitherto the gearing of carpet-sweeping machines has been constructed entirely of metal, and their operation attended with considerable noise, and to insure a requisite degree of traction an India-rubber band or covering has been secured upon the periphery of the traction-wheel.

The advantage of my improvement in combining a rubber gear with a rubber traction-wheel is obvious, to wit, a noiseless operation of the gear, with requisite traction to insure the rotation of the brush by a very compact, simple, and durable means.

In the accompanying sheet of drawing—

A represents the driving-gear and B B the traction portions of the driving-wheel, all being made of India rubber and out of one piece, the traction portions B B being one at each side of the gear A, all being pressed or formed in a suitable mold to have the requisite degree of hardness and elasticity to resist wear.

C is the gear which is attached to the axis of the brush D, which sweeps up the dust from the carpet. This gear C and brush D are both shown by dotted lines in fig. 1, and in fig. 2 the gear C only is shown in this manner, a portion of the driving-gear A, two cogs, being shown in solid lines.

By this arrangement the driving-gear and the two rims B B being all formed in one solid piece of India rubber, the two essential requisites in a carpet-sweeping machine are obtained, to wit, a noiseless operation and sufficient traction. Belts have been used to communicate motion from the driving-wheel to the rotary brush, and machines have been devised to communicate motion by means of friction-wheels, dispensing with gears, but they have failed, or not come into general use, owing in one case to the wear, stretching and breaking of the belts, and, in the other case, to the uncertainty attending the depending upon the pressure of wheels in contact to cause rotation.

I do not claim a combined gear and traction-wheel with two rims, made of metal, as this is not new; but

Having thus described my invention,

What I claim as new, and desire to secure by Letters Patent, is—

As a new article of manufacture, a combined gear and traction-wheel with two rims, when made, as herein described, of solid rubber, and used on carpet-sweepers, for the purposes specified.

G. F. TAYLOR.

Witnesses:
A. R. HAIGHT,
A. W. MACDONALD.